US009888249B2

(12) United States Patent
Minoo et al.

(10) Patent No.: US 9,888,249 B2
(45) Date of Patent: Feb. 6, 2018

(54) DEVICES AND METHODS FOR SAMPLE ADAPTIVE OFFSET CODING AND/OR SELECTION OF EDGE OFFSET PARAMETERS

(71) Applicant: GOOGLE TECHNOLOGY HOLDINGS LLC, Mountain View, CA (US)

(72) Inventors: Koohyar Minoo, San Diego, CA (US); David Baylon, San Diego, CA (US); Yue Yu, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 15/643,795

(22) Filed: Jul. 7, 2017

(65) Prior Publication Data

US 2017/0310980 A1    Oct. 26, 2017

Related U.S. Application Data

(63) Continuation of application No. 13/734,774, filed on Jan. 4, 2013, now Pat. No. 9,716,882.

(Continued)

(51) Int. Cl.
| H04N 19/00 | (2014.01) |
| H04N 19/182 | (2014.01) |
| H04N 19/82 | (2014.01) |
| H04N 19/117 | (2014.01) |
| H04N 19/176 | (2014.01) |
| H04N 19/14 | (2014.01) |

(52) U.S. Cl.
CPC ......... *H04N 19/182* (2014.11); *H04N 19/117* (2014.11); *H04N 19/14* (2014.11); *H04N 19/176* (2014.11); *H04N 19/82* (2014.11)

(58) Field of Classification Search
CPC ........ H04N 7/26244; H04N 7/30; H04N 7/50; H04N 7/26085; H04N 7/26106
See application file for complete search history.

(56) References Cited

U.S. PATENT DOCUMENTS 5,446,806 A * 8/1995 Ran ........................ H04N 19/96
358/1.9
5,859,979 A * 1/1999 Tung ...................... G06Q 10/10
348/E7.082

(Continued)

OTHER PUBLICATIONS

"Unified Deblocking and SAO", 7. JCT-VC Meeting; 98. MPEG Meeting; Nov. 21-Nov. 30, 2011; Geneva; No. JCTVC-G608, Nov. 9, 2011, Segall.*

*Primary Examiner* — Frank Huang
(74) *Attorney, Agent, or Firm* — Young Basile Hanlon & MacFarlane, P.C.

(57) ABSTRACT

In one embodiment, a method for encoding sample adaptive offset (SAO) values in a video encoding process is provided, the method comprising: selecting an edge offset type; selecting one of one or more edge offset sub-classes; within at least one of the edge offset sub-classes, generating an interpolated pixel value that is related to a current pixel value; generating an offset value that is related to the interpolated pixel value; and optionally applying the offset value to at least the current pixel value to form an SAO compensated value.

18 Claims, 9 Drawing Sheets

Related U.S. Application Data (60) Provisional application No. 61/583,555, filed on Jan. 5, 2012, provisional application No. 61/589,297, filed on Jan. 21, 2012, provisional application No. 61/597,041, filed on Feb. 9, 2012.

(56) References Cited

U.S. PATENT DOCUMENTS

| | | | | |
|---|---|---|---|---|
| 7,782,722 B2 * | 8/2010 | Miyaoka | ............... | G11B 7/094 369/44.29 |
| 8,085,850 B2 * | 12/2011 | Zador | ............... | G06T 9/008 375/240.01 |
| 8,259,808 B2 * | 9/2012 | Lin | ............... | H04N 21/23436 375/240.16 |
| 8,351,310 B2 * | 1/2013 | Feng | ............... | G11B 7/094 369/44.32 |
| 8,660,174 B2 * | 2/2014 | Fu | ............... | H04N 19/46 375/240 |
| 8,861,617 B2 * | 10/2014 | Chen | ............... | H04N 19/00103 375/240.01 |
| 9,001,883 B2 * | 4/2015 | Tsai | ............... | H04N 19/136 375/240 |
| 9,008,170 B2 * | 4/2015 | Chong | ............... | H04N 19/105 375/240.02 |

* cited by examiner

DEVICES AND METHODS FOR SAMPLE ADAPTIVE OFFSET CODING AND/OR SELECTION OF EDGE OFFSET PARAMETERS

CROSS-REFERENCE TO RELATED APPLICATION(S)

The present disclosure is a continuation of U.S. patent application Ser. No. 13/734,774, filed Jan. 4, 2013, which claims the benefit of U.S. Provisional Application No. 61/583,555, filed Jan. 5, 2012, U.S. Provisional Application No. 61/589,297, filed Jan. 21, 2012, and U.S. Provisional Application No. 61/597,041, filed Feb. 9, 2012, the disclosures of which are incorporated by reference herein in their entirety.

FIELD

The disclosure relates generally to the field of video coding, and more specifically to systems, devices and methods for sample adaptive offset (SAO) coding and/or selection of edge offset (EO) parameters.

BACKGROUND

Video compression uses block processing for many operations. In block processing, a block of neighboring pixels is grouped into a coding unit and compression operations treat this group of pixels as one unit to take advantage of correlations among neighboring pixels within the coding unit. Block-based processing often includes prediction coding and transform coding. Transform coding with quantization is a type of data compression which is commonly "lossy" as the quantization of a transform block taken from a source picture often discards data associated with the transform block in the source picture, thereby lowering its bandwidth requirement but often also resulting in quality loss in reproducing of the original transform block from the source picture.

MPEG-4 AVC, also known as H.264, is an established video compression standard that uses transform coding in block processing. In H.264, a picture is divided into macroblocks (MBs) of 16×16 pixels. Each MB is often further divided into smaller blocks. Blocks equal in size to or smaller than a MB are predicted using intra-/inter-picture prediction, and a spatial transform along with quantization is applied to the prediction residuals. The quantized transform coefficients of the residuals are commonly encoded using entropy coding methods (e.g., variable length coding or arithmetic coding). Context Adaptive Binary Arithmetic Coding (CABAC) was introduced in H.264 to provide a substantially lossless compression efficiency by combining an adaptive binary arithmetic coding technique with a set of context models. Context model selection plays a role in CABAC in providing a degree of adaptation and redundancy reduction. H.264 specifies two kinds of scan patterns over 2D blocks. A zigzag scan is used for pictures coded with progressive video compression techniques and an alternative scan is for pictures coded with interlaced video compression techniques.

HEVC (High Efficiency Video Coding), an international video coding standard developed to succeed H.264, extends transform block sizes to 16×16 and 32×32 pixels to benefit high definition (HD) video coding.

BRIEF DESCRIPTION OF THE SEVERAL VIEWS OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

BRIEF SUMMARY

Accordingly, there is provided herein systems and methods that improve video quality by selection, coding, and signaling of parameters in a sample adaptive offset (SAO) process. The methods and systems described herein generally pertain to video processing such as video encoders and decoders.

In an embodiment, a method for decoding an encoded block of an encoded video frame is provided. The method comprises decoding the encoded block using a sample adaptive offset compensated value generated by applying an offset value to a current pixel value of the encoded block. The sample adaptive offset compensated value is limited by an interpolated pixel value generated using left and right neighboring pixel values of the current pixel value.

In an embodiment, an apparatus for decoding an encoded block of an encoded video frame is provided. The apparatus comprises a processor configured to execute instructions stored in a non-transitory storage medium to decode the encoded block using a sample adaptive offset compensated value generated by applying an offset value to a current pixel value of the encoded block. The sample adaptive offset compensated value is limited by an interpolated pixel value generated using left and right neighboring pixel values of the current pixel value.

In an embodiment, a method is provided. The method comprises applying, to a current pixel value, an offset value limited by a weighted combination of left and right neighboring pixel values of the current pixel value.

DETAILED DESCRIPTION

In this disclosure, the term "coding" refers to encoding that occurs at the encoder or decoding that occurs at the decoder. Similarly, the term coder refers to an encoder, a decoder, or a combined encoder/decoder (CODEC). The terms coder, encoder, decoder and CODEC all refer to specific machines designed for the coding (encoding and/or decoding) of video data consistent with this disclosure.

The present discussion begins with a very brief overview of some terms and techniques known in the art of digital image compression. This overview is not meant to teach the known art in any detail. Those skilled in the art know how to find greater details in textbooks and in the relevant standards.

An example of a video system in which an embodiment of the disclosure may be used will now be described. It is understood that elements depicted as function blocks in the figures may be implemented as hardware, software, or a combination thereof. Furthermore, embodiments of the disclosure may also be employed on other systems, such as on a personal computer, smartphone or tablet computer.

Figure 1A:
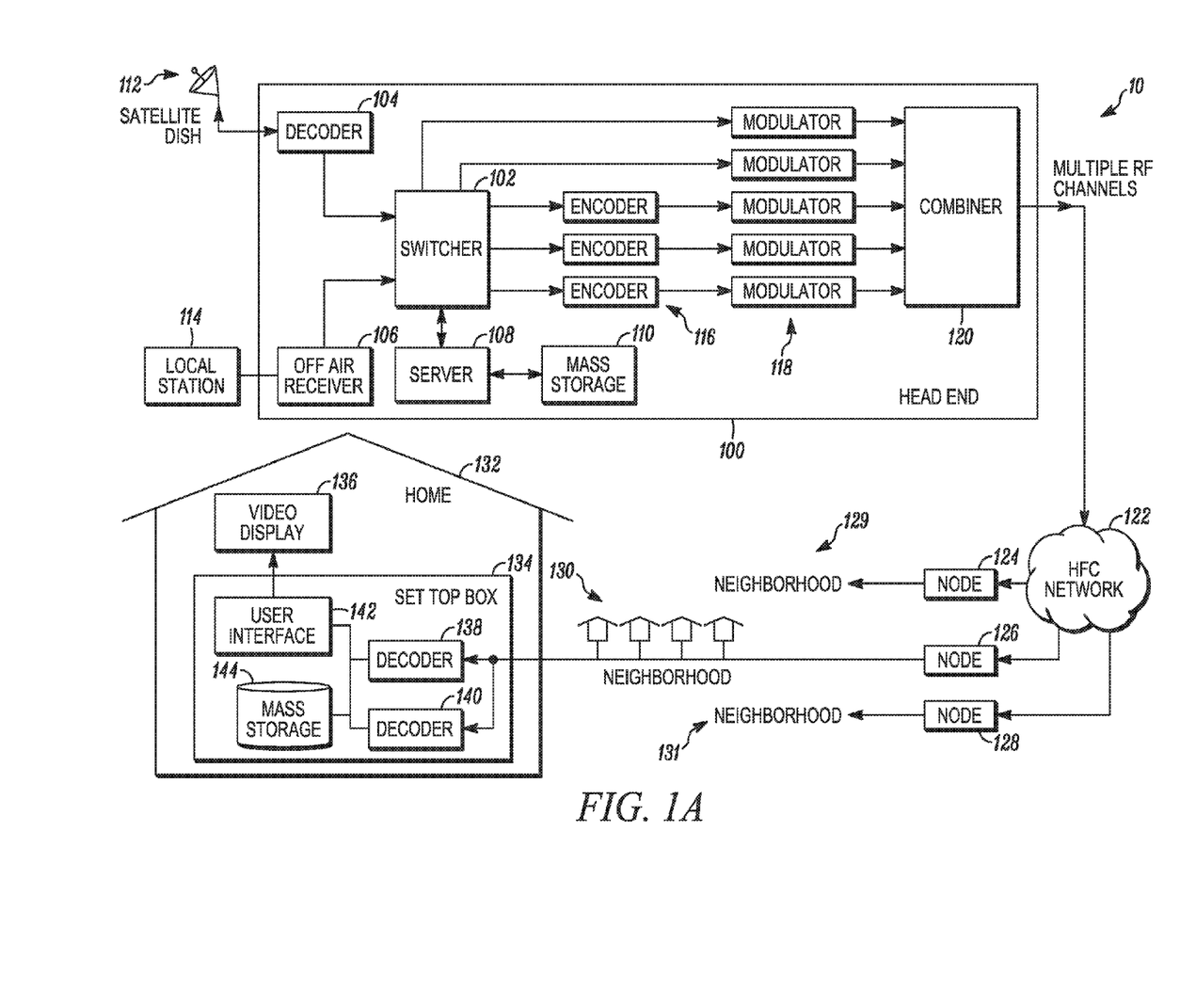
FIG. 1A is a video system in which the various embodiments of the disclosure may be used.

Referring to FIG. 1A, a video system, generally labeled 10, may include a head end 100 of a cable television network. The head end 100 may be configured to deliver video content to neighborhoods 129, 130 and 131. The head end 100 may operate within a hierarchy of head ends, with the head ends higher in the hierarchy generally having greater functionality. The head end 100 may be communicatively linked to a satellite dish 112 and receive video signals for non-local programming from it. The head end 100 may also be communicatively linked to a local station 114 that delivers local programming to the head end 100. The head end 100 may include a decoder 104 that decodes the video signals received from the satellite dish 112, an off-air receiver 106 that receives the local programming from the local station 114, a switcher 102 that routes data traffic among the various components of the head end 100, encoders 116 that encode video signals for delivery to customers, modulators 118 that modulate signals for delivery to customers, and a combiner 120 that combines the various signals into a single, multi-channel transmission.

The head end 100 may also be communicatively linked to a hybrid fiber cable (HFC) network 122. The HFC network 122 may be communicatively linked to a plurality of nodes 124, 126, and 128. Each of the nodes 124, 126, and 128 may be linked by coaxial cable to one of the neighborhoods 129, 130 and 131 and deliver cable television signals to that neighborhood. One of the neighborhoods 130 of FIG. 1A is shown in more detail. The neighborhood 130 may include a number of residences, including a home 132 shown in FIG. 1A. Within the home 132 may be a set-top box 134 communicatively linked to a video display 136. The set-top box 134 may include a first decoder 138 and a second decoder 140. The first and second decoders 138 and 140 may be communicatively linked to a user interface 142 and a mass storage device 144. The user interface 142 may be communicatively linked to the video display 136.

During operation, head end 100 may receive local and nonlocal programming video signals from the satellite dish 112 and the local station 114. The nonlocal programming video signals may be received in the form of a digital video stream, while the local programming video signals may be received as an analog video stream. In some embodiments, local programming may also be received as a digital video stream. The digital video stream may be decoded by the decoder 104 and sent to the switcher 102 in response to customer requests. The head end 100 may also include a server 108 communicatively linked to a mass storage device 110. The mass storage device 110 may store various types of video content, including video on demand (VOD), which the server 108 may retrieve and provide to the switcher 102. The switcher 102 may route local programming directly to the modulators 118, which modulate the local programming, and route the non-local programming (including any VOD) to the encoders 116. The encoders 116 may digitally encode the non-local programming. The encoded non-local programming may then be transmitted to the modulators 118. The combiner 120 may be configured to receive the modulated analog video data and the modulated digital video data, combine the video data and transmit it via multiple radio frequency (RF) channels to the HFC network 122.

The HFC network 122 may transmit the combined video data to the nodes 124, 126 and 128, which may retransmit the data to their respective neighborhoods 129, 130 and 131. The home 132 may receive this video data at the set-top box 134, more specifically at the first decoder 138 and the second decoder 140. The first and second decoders 138 and 140 may decode the digital portion of the video data and provide the decoded data to the user interface 142, which then may provide the decoded data to the video display 136.

The encoders 116 and the decoders 138 and 140 of FIG. 1A (as well as all of the other steps and functions described herein) may be implemented as computer code comprising computer readable instructions stored on a computer readable storage device, such as memory or another type of storage device. The computer code may be executed on a computer system by a processor, such as an application-specific integrated circuit (ASIC), or other type of circuit. For example, computer code for implementing the encoders 116 may be executed on a computer system (such as a server) residing in the headend 100. Computer code for the decoders 138 and 140, on the other hand, may be executed on the set-top box 134, which constitutes a type of computer system. The code may exist as software programs comprised of program instructions in source code, object code, executable code or other formats. It should be appreciated that the computer code for the various components shown in FIG. 1A may reside anywhere in system 10 or elsewhere (such as in a cloud network), that is determined to be desirable or advantageous. Furthermore, the computer code may be located in one or more components, provided the instructions may be effectively performed by the one or more components. The present description is developed based on the premise that each area of a picture in a video stream is most efficiently described with a specific set of features. For example, a set of features can be determined for the parameters that efficiently describes a face for a given face model. In addition, the efficiency of a set of features that describe a part of an image depends on the application (e.g., perceptual relevance for those applications where humans are the end users) and efficiency of the compression algorithm used in encoding for minimum description length of those features.

Figure 1B:
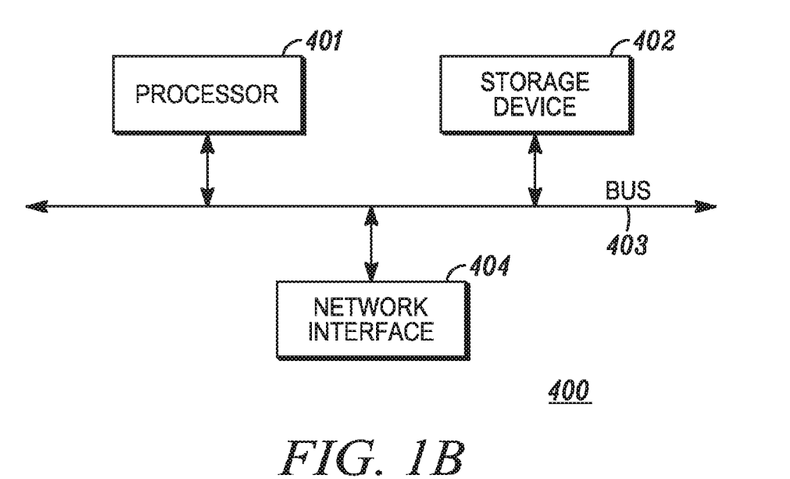
FIG. 1B is a computer system on which embodiments of the disclosure may be implemented.

FIG. 1B shows an example of a computer system on which computer code for the encoders 116 and the decoders 138 and 140 may be executed. The computer system, generally labeled 400, includes a processor 401, or processing circuitry, that may implement or execute software instructions performing some or all of the methods, functions and other steps described herein. Commands and data from processor 401 may be communicated over a communication bus 403, for example. Computer system 400 may also include a computer readable storage device 402, such as random access memory (RAM), where the software and data for processor 401 may reside during runtime. Storage device 402 may also include non-volatile data storage. Computer system 400 may include a network interface 404 for connecting to a network. Other known electronic components may be added or substituted for the components depicted in the computer system 400. The computer system 400 may reside in the headend 100 and execute the encoders 116, and may also be embodied in the set-top box 134 to execute the decoders 138 and 140. Additionally, the computer system 400 may reside in places other than the headend 100 and the set-top box 134, and may be miniaturized so as to be integrated into a smartphone or tablet computer.

Video encoding systems achieve compression by removing redundancy in the video data, e.g., by removing those elements that can be discarded without adversely affecting reproduction fidelity. Because video signals take place in time and space, most video encoding systems exploit both temporal and spatial redundancy present in these signals. Typically, there is high temporal correlation between successive frames. This is also true in the spatial domain for pixels which are close to each other. Thus, high compression gains are achieved by carefully exploiting these spatio-temporal correlations.

Figure 2A:
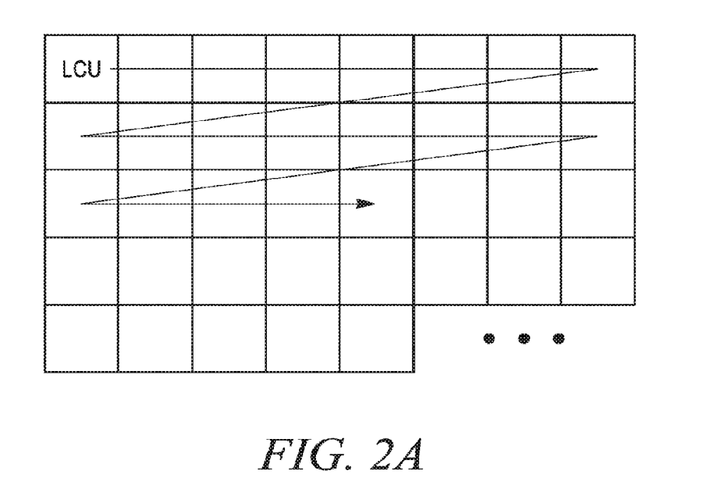
FIGS. 2A, 2B, 3A and 3B illustrate certain video encoding principles according to embodiments of the disclosure.
Figure 3A:
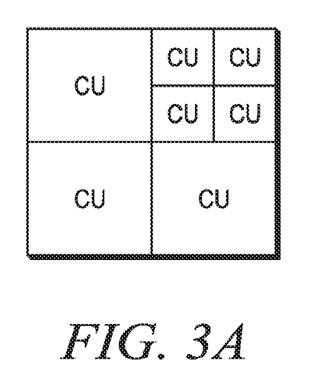

A high-level description of how video data gets encoded and decoded by the encoders 116 and the decoders 138 and 140 in an embodiment of the disclosure will now be provided. In this embodiment, the encoders and decoders operate according to a High Efficiency Video Coding (HEVC) method. HEVC is a block-based hybrid spatial and temporal predictive coding method. In HEVC, an input picture is first divided into square blocks, called LCUs (largest coding units) or CTUs (coding tree units), as shown in FIG. 2A. Unlike other video coding standards, in which the basic coding unit is a macroblock of 16×16 pixels, in HEVC, the LCU can be as large as 128×128 pixels. An LCU can be divided into four square blocks, called CUs (coding units), which are a quarter of the size of the LCU. Each CU can be further split into four smaller CUs, which are a quarter of the size of the original CU. The splitting process can be repeated until certain criteria are met. FIG. 3A shows an example of LCU partitioned into CUs.

Figure 3B:
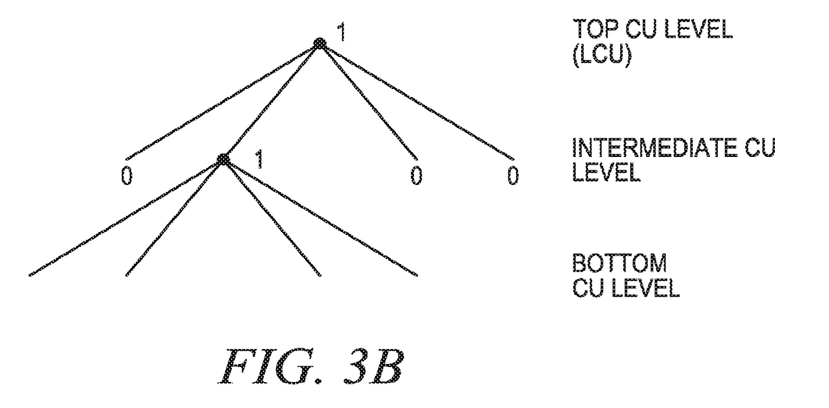

How a particular LCU is split into CUs can be represented by a quadtree. At each node of the quadtree, a flag is set to "1" if the node is further split into sub-nodes. Otherwise, the flag is unset at "0." For example, the LCU partition of FIG. 3A can be represented by the quadtree of FIG. 3B. These "split flags" may be jointly coded with other flags in the video bitstream, including a skip mode flag, a merge mode flag, and a predictive unit (PU) mode flag, and the like. In the case of the quadtree of FIG. 3B, the split flags 10100 could be coded as overhead along with the other flags. Syntax information for a given CU may be defined recursively, and may depend on whether the CU is split into sub-CUs.

Figure 2B:
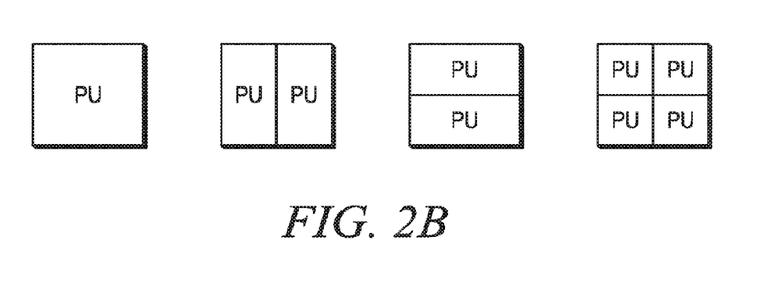

A CU that is not split (e.g., a CU corresponding a terminal, or "leaf" node in a given quadtree) may include one or more prediction units (PUs). In general, a PU represents all or a portion of the corresponding CU, and includes data for retrieving a reference sample for the PU for purposes of performing prediction for the CU. Thus, at each leaf of a quadtree, a final CU of 2N×2N can possess one of four possible patterns (N×N, N×2N, 2N×N and 2N×2N), as shown in FIG. 2B. While shown for a 2N×2N CU, other PUs having different dimensions and corresponding patterns (e.g., square or rectangular) may be used. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s). The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

In general, in intra-prediction encoding, a high level of spatial correlation is present between neighboring blocks in a frame. Consequently, a block can be predicted from the nearby encoded and reconstructed blocks, giving rise to the intra prediction. In some embodiments, the prediction can be formed by a weighted average of the previously encoded samples, located above and to the left of the current block. The encoder may select the mode that minimizes the difference or cost between the original and the prediction and signals this selection in the control data.

In general, in inter-prediction encoding, video sequences have high temporal correlation between frames, enabling a block in the current frame to be accurately described by a region in the previous coded frames, which are known as reference frames. Inter-prediction utilizes previously encoded and reconstructed reference frames to develop a prediction using a block-based motion estimation and compensation technique.

Following intra-predictive or inter-predictive encoding to produce predictive data and residual data, and following any transforms (such as the 4×4 or 8×8 integer transform used in H.264/AVC or a discrete cosine transform (DCT)) to produce transform coefficients, quantization of transform coefficients may be performed. Quantization generally refers to a process in which transform coefficients are quantized to possibly reduce the amount of data used to represent the coefficients, e.g., by converting high precision transform coefficients into a finite number of possible values. These steps will be discussed in more detail below.

Figure 5A:
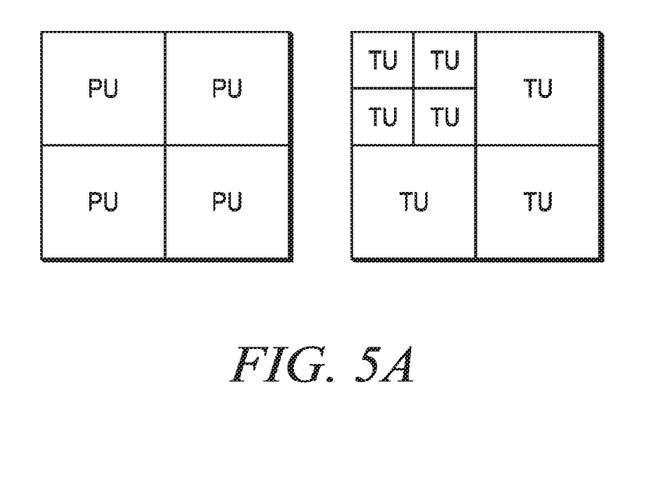
FIGS. 5A and 5B illustrate further video coding principles according to an embodiments of the disclosure.
Figure 5B:
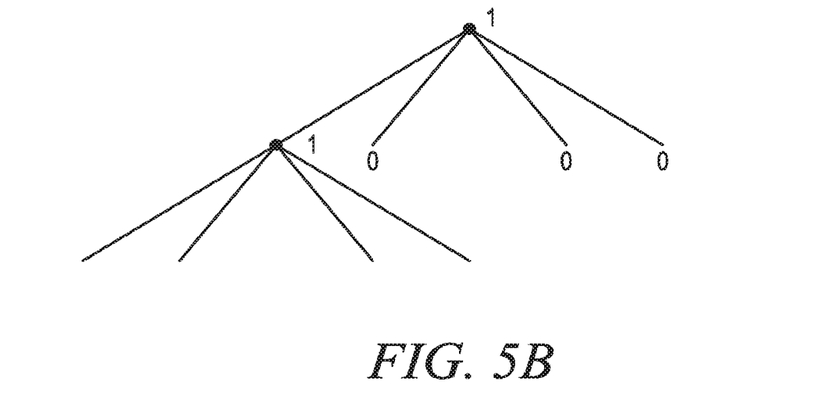

Each CU can also be divided into transform units (TUs) by application of a block transform operation. A block transform operation tends to decorrelate the pixels within the block and compact the block energy into the low order coefficients of the transform block. In some embodiments, one transform of 8×8 or 4×4 may be applied. In other embodiments, a set of block transforms of different sizes may be applied to a CU, as shown in FIG. 5A where the left block is a CU partitioned into PUs and the right block is the associated set of transform units (TUs). The size and location of each block transform within a CU is described by a separate quadtree, called RQT. FIG. 5B shows the quadtree representation of TUs for the CU in the example of FIG. 5A. In this example, 11000 is coded and transmitted as part of the overhead.

The TUs and PUs of any given CU may be used for different purposes. TUs are typically used for transformation, quantizing and coding operations, while PUs are typically used for spatial and temporal prediction. There is not necessarily a direct relationship between the number of PUs and the number of TUs for a given CU.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized. In video encoding, quantization is the step that introduces loss, so that a balance between bitrate and reconstruction quality can be established. These steps will be discussed further below.

Block partitioning serves an important purpose in block-based video coding techniques. Using smaller blocks to code video data may result in better prediction of the data for locations of a video frame that include high levels of detail, and may therefore reduce the resulting error (e.g., deviation of the prediction data from source video data), represented as residual data. In general, prediction exploits the spatial or temporal redundancy in a video sequence by modeling the correlation between sample blocks of various dimensions, such that only a small difference between the actual and the predicted signal needs to be encoded. A prediction for the current block is created from the samples which have already been encoded. While potentially reducing the residual data, such techniques may, however, require additional syntax information to indicate how the smaller blocks are partitioned relative to a video frame, and may result in an increased coded video bitrate. Accordingly, in some techniques, block partitioning may depend on balancing the desirable reduction in residual data against the resulting increase in bitrate of the coded video data due to the additional syntax information.

In general, blocks and the various partitions thereof (e.g., sub-blocks) may be considered video blocks. In addition, a slice may be considered to be a plurality of video blocks (e.g., macroblocks, or coding units), and/or sub-blocks (partitions of macroblocks, or sub-coding units). Each slice may be an independently decodable unit of a video frame. Alternatively, frames themselves may be decodable units, or other portions of a frame may be defined as decodable units. Furthermore, a GOP, also referred to as a group of pictures, may be defined as a decodable unit.

Figure 4A:
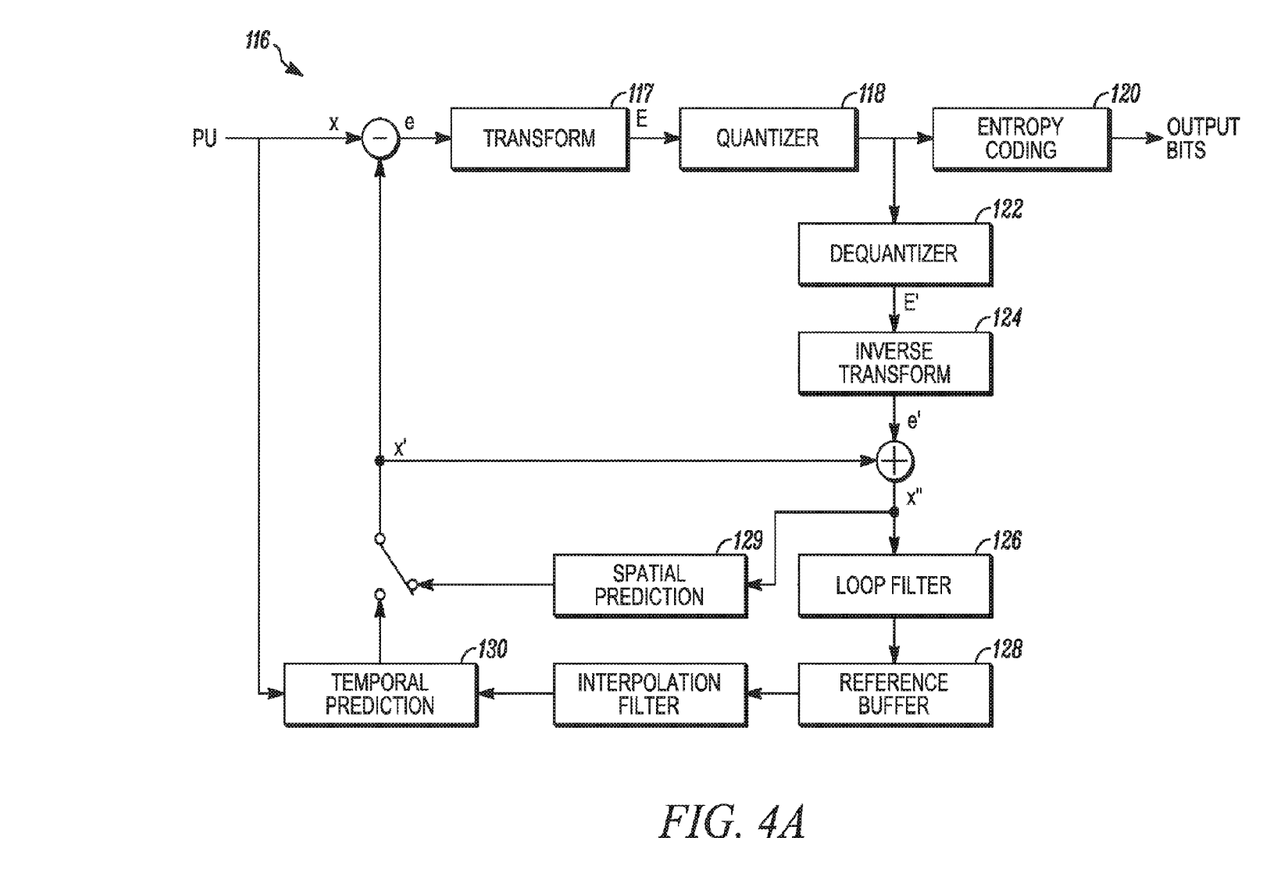
FIGS. 4A and 4B show possible architectures for an encoder and a decoder according to embodiments of the disclosure.

The encoders 116 (FIG. 1A) may be, according to an embodiment of the disclosure, composed of several functional modules as shown in FIG. 4A. These modules may be implemented as hardware, software, or any combination of the two. Given a current PU, x, a prediction PU, x', may first be obtained through either spatial prediction or temporal prediction. This spatial or temporal prediction may be performed by a spatial prediction module 129 or a temporal prediction module 130 respectively.

There are several possible spatial prediction directions that the spatial prediction module 129 can perform per PU, including horizontal, vertical, 45-degree diagonal, 135-degree diagonal, DC, Planar, etc. Including the Luma intra modes, an additional mode, called IntraFromLuma, may be used for the Chroma intra prediction mode. A syntax indicates the spatial prediction direction per PU.

The encoder 116 (FIG. 1A) may perform temporal prediction through motion estimation operation. Specifically, the temporal prediction module 130 (FIG. 4A) may search for a best match prediction for the current PU over reference pictures. The best match prediction may be described by motion vector (MV) and associated reference picture (refIdx). Generally, a PU in B pictures can have up to two MVs. Both MV and refIdx may be part of the syntax in the bitstream.

The prediction PU may then be subtracted from the current PU, resulting in the residual PU, e. The residual PU, e, may then be transformed by a transform module 117, one transform unit (TU) at a time, resulting in the residual PU in the transform domain, E. To accomplish this task, the transform module 117 may use e.g., either a square or a non-square block transform.

Referring back to FIG. 4A, the transform coefficients E, may then be quantized by a quantizer module 118, converting the high precision transform coefficients into a finite number of possible values. The quantization process may reduce the bit depth associated with some or all of the coefficients. For example, an n-bit value may be rounded down to an m-bit value during quantization, where n is greater than m. In some embodiments, external boundary conditions are used to produce modified one or more transform coefficients. For example, a lower range or value may be used in determining if a transform coefficient is given a nonzero value or just zeroed out. As should be appreciated, quantization is a lossy operation and the loss by quantization generally cannot be recovered.

The quantized coefficients may then be entropy coded by an entropy coding module 120, resulting in the final compression bits. The specific steps performed by the entropy coding module 120 will be discussed below in more detail.

To facilitate temporal and spatial prediction, the encoder 116 may also take the quantized transform coefficients E and dequantize them with a dequantizer module 122 resulting in the dequantized transform coefficients E'. The dequantized transform coefficients are then inverse transformed by an inverse transform module 124, resulting in the reconstructed residual PU, e'. The reconstructed residual PU, e', is then added to the corresponding prediction, x', either spatial or temporal, to form a reconstructed PU, x'.

Referring still to FIG. 4A, a deblocking filter (DBF) operation may be performed on the reconstructed PU, x'', first to reduce blocking artifacts. A sample adaptive offset (SAO) process may be conditionally performed after the completion of the deblocking filter process for the decoded picture, which compensates the pixel value offset between reconstructed pixels and original pixels. In some embodiments, both the DBF operation and SAO process are implemented by adaptive loop filter functions, which may be performed conditionally by a loop filter module 126 over the reconstructed PU. In some embodiments, the adaptive loop filter functions minimize the coding distortion between the input and output pictures. In some embodiments, loop filter module 126 operates during an inter-picture prediction loop. If the reconstructed pictures are reference pictures, they may be stored in a reference buffer 128 for future temporal prediction.

HEVC specifies two loop filters that are applied in order with the de-blocking filter (DBF) applied first and the sample adaptive offset (SAO) filter applied afterwards. The DBF is similar to the one used by H.264/MPEG-4 AVC but with a simpler design and better support for parallel processing. In HEVC the DBF only applies to an 8×8 sample grid while with H.264/MPEG-4 AVC the DBF applies to a 4×4 sample grid. DBF uses an 8×8 sample grid since it causes no noticeable degradation and significantly improves parallel processing because the DBF no longer causes cascading interactions with other operations. Another change is that HEVC only allows for three DBF strengths of 0 to 2. HEVC also requires that the DBF first apply horizontal filtering for vertical edges to the picture and only after that does it apply vertical filtering for horizontal edges to the picture. This allows for multiple parallel threads to be used for the DBF.

The SAO filter process is applied after the DBF and is made to allow for better reconstruction of the original signal amplitudes by using e.g., a look up table that includes some parameters that are based on a histogram analysis made by the encoder. The SAO filter has two basic types which are the edge offset (EO) type and the band offset (BO) type. One of the SAO types can be applied per coding tree block (CTB). The edge offset (EO) type has four sub-types corresponding to processing along four possible directions (e.g., horizontal, vertical, 135 degree, and 45 degree). For a given EO sub-type, the edge offset (EO) processing operates by comparing the value of a pixel to two of its neighbors using one of four different gradient patterns. An offset is applied to pixels in each of the four gradient patterns. For pixel values that are not in one of the gradient patterns, no offset is applied. The band offset (BO) processing is based directly on the sample amplitude which is split into 32 bands. An offset is applied to pixels in 16 of the 32 bands, where a group of 16 bands corresponds to a BO sub-type. The SAO filter process was designed to reduce distortion compared to the original signal by adding an offset to sample values. It can increase edge sharpness and reduce ringing and impulse artifacts. Further detail on the SAO process will be discussed below with reference to FIGS. 6-8.

In an embodiment of the disclosure, intra pictures (such as an I picture) and inter pictures (such as P pictures or B pictures) are supported by the encoder 116 (FIG. 1A). An intra picture may be coded without referring to other pictures. Hence, spatial prediction may be used for a CU/PU inside an intra picture. An intra picture provides a possible point where decoding can begin. On the other hand, an inter picture generally aims for high compression. Inter picture supports both intra and inter prediction. A CU/PU in inter picture is either spatially or temporally predictive coded. Temporal references are the previously coded intra or inter pictures.

The operation of the entropy coding module 120 (FIG. 4A) according to an embodiment will now be described in more detail. The entropy coding module 120 takes the quantized matrix of coefficients received from the quantizer module 118 and uses it to generate a sign matrix that represents the signs of all of the quantized coefficients and to generate a significance map. A significance map may be a matrix in which each element specifies the position(s) of the non-zero quantized coefficient(s) within the quantized coefficient matrix. Specifically, given a quantized 2D transformed matrix, if the value of a quantized coefficient at a position (y, x) is non-zero, it may be considered as significant and a "1" is assigned for the position (y, x) in the associated significance map. Otherwise, a "0" is assigned to the position (y, x) in the significance map.

Once the entropy coding module 120 has created the significance map, it may code the significance map. In one embodiment, this is accomplished by using a context-based adaptive binary arithmetic coding (CABAC) technique. In doing so, the entropy coding module 120 scans the significance map along a scanning line and, for each entry in the significance map, the coding module chooses a context model for that entry. The entropy coding module 120 then codes the entry based on the chosen context model. That is, each entry is assigned a probability based on the context model (the mathematical probability model) being used. The probabilities are accumulated until the entire significance map has been encoded.

The value output by the entropy coding module 120 as well as the entropy encoded signs, significance map and non-zero coefficients may be inserted into the bitstream by the encoder 116 (FIG. 1A). This bitstream may be sent to the decoders 138 and 140 over the HFC network 122.

It should be noted that the prediction, transform, and quantization described above may be performed for any block of video data, e.g., to a PU and/or TU of a CU, or to a macroblock, depending on the specified coding standard.

Figure 4B:
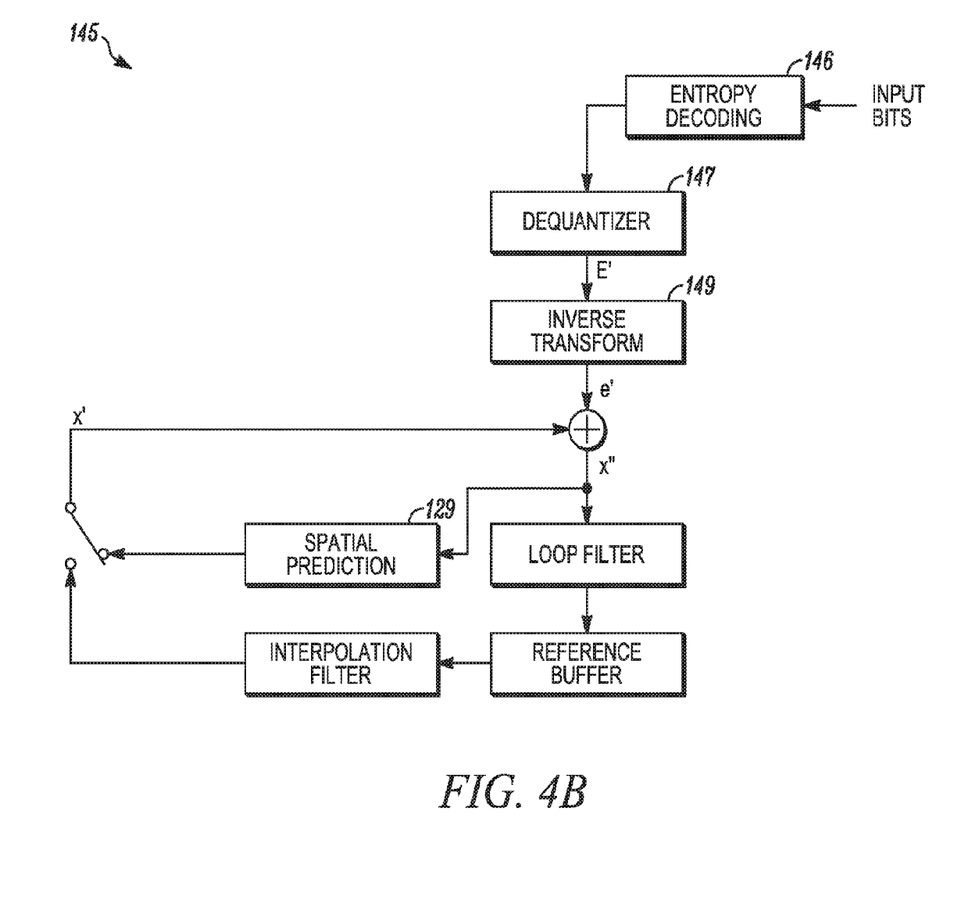

When the decoders 138 and 140 (FIG. 1A) receive the bitstream, they perform the functions shown in e.g., FIG. 4B. An entropy decoding module 146 of the decoder 145 may decode the sign values, significance map and non-zero coefficients to recreate the quantized and transformed coefficients. In decoding the significance map, the entropy decoding module 146 may perform the reverse of the procedure described in conjunction with the entropy coding module 120—decoding the significance map along a scanning pattern made up of scanning lines. The entropy decoding module 146 then may provide the coefficients to a dequantizer module 147, which dequantizes the matrix of coefficients, resulting in E'. The dequantizer module 147 may provide the dequantized coefficients to an inverse transform module 149. The inverse transform module 149 may perform an inverse transform operation on the coefficients resulting in e'. Filtering and spatial prediction may be applied in a manner described in conjunction with FIG. 4A.

Sample Adaptive Offset (SAO)

In an SAO process, an offset is added to each pixel to reduce the distortion of the reconstructed pixel relative to the original pixel. In one embodiment, for a partition in a luma or chroma component, an encoder categorizes the pixels into one of six possible types (both types and sub-types are collectively referred to as types here): four edges offset (EO) types E0, E1, E2, E3 and two band offset (BO) types B0, B1. For the EO types, the pixels are further sub-categorized into one of five possible sub-classes based upon local behavior along the EO type direction. These five sub-classes are described in further detail below. For the BO types, the pixels are further sub-categorized into one of sixteen possible sub-classes based upon intensity. In some embodiments, for a given sub-class of pixels within an SAO type, the same offset is applied. For example, if the offset for sub-class i is $o_i$, then the SAO output corresponding to an input of $p_i$ will be $p_i+o_i$. The encoder typically selects the SAO type per sub-class to minimize a cost function. For example, if the distortion for a given type t and set of offsets $o_{t,i}$ is $D_{t,i}$ and the corresponding bitrate is $R_{t,i}$ then the cost function can be $J_{t,i}=D_{t,i}+\text{lambda}*R_{t,i}$, where lambda is a weighting factor. The encoder may signal to the decoder the SAO type per partition and the corresponding offsets per sub-class, and the decoder may perform the classification for the SAO type and applies the offsets per sub-class to each pixel. The SAO type can be signaled per color component, or a given type can be signaled and used for more than one color component. In some embodiments, it is also possible for the encoder to not use or turn off SAO, and this can also be signaled to the decoder.

Coding of SAO Type

For coding of SAO type, there are generally two coding methods: high efficiency (HE) and low complexity (LC). In LC, variable length codewords (VLCs) or binarized codewords are assigned to the SAO types; while in HE, the binarized codeword typically assigned to the type is followed by context-based adaptive binary arithmetic coding (CABAC). For the HE case, an encoder may signal the SAO type using a unary code, for example (0's and 1's can be interchanged) as shown in Table 1:

TABLE 1

| SAO Type | Code |
|---|---|
| Off | 0 |
| E0 | 10 |
| E1 | 110 |
| E2 | 1110 |
| E3 | 11110 |
| B0 | 111110 |
| B1 | 1111110 |

In Table 1, when SAO type is Off, no SAO is applied and the corresponding codeword is 0. The other codewords correspond to the other EO and BO types.

It may be noted that the units or digits within a codeword may be referred to as "bits" for LC and "bins" for HE. The difference in terminology is a result of applying CABAC to the codeword in the HE method. As used herein, "units" includes both bins and bits in codewords.

EDGE Offsets Modified EO Type

Figure 6:
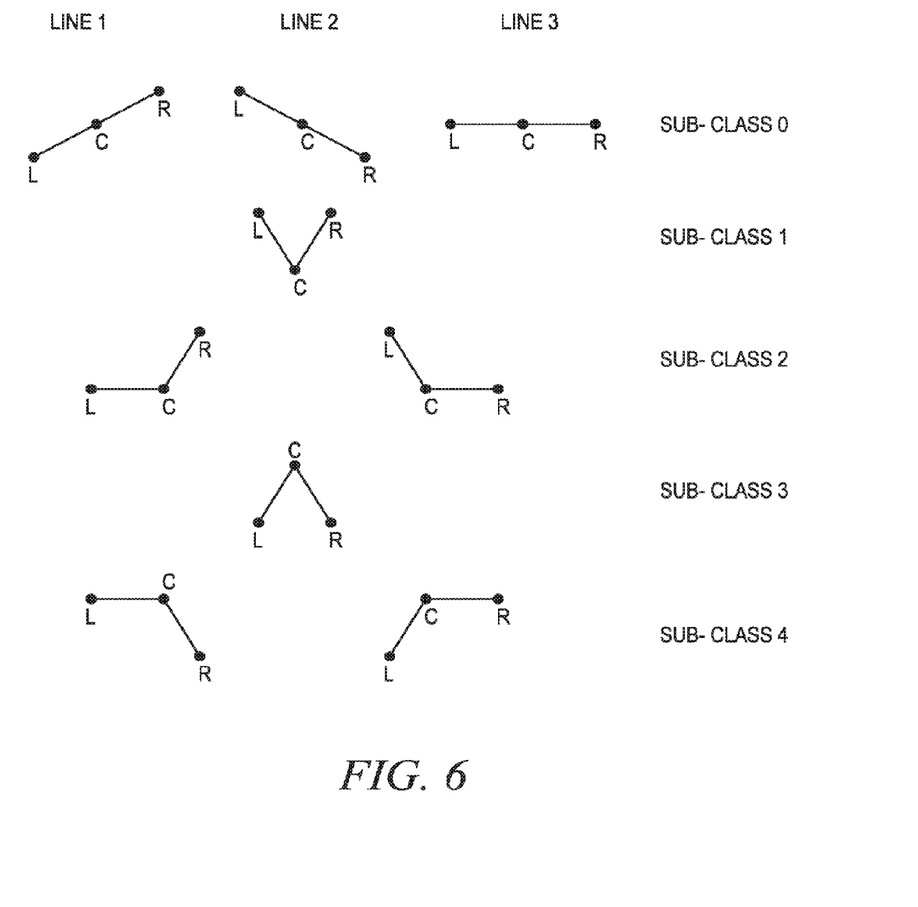
FIG. 6 illustrates 5 possible edge offset (EO) sub-classes for sample adaptive offset (SAO) according to embodiments of the disclosure.

As described above, there are four possible EO types or classes, and five possible sub-classes per type. As used here, EO type or class refers to the direction along where pixels will be processed, and sub-class refers to the categorization of pixel values according to the gradient pattern along the EO type or class direction. The 5 possible EO sub-classes per type (e.g., sub-class 0-4) are illustrated in FIG. 6, where the 3 pixels indicate whether neighboring pixels are greater than, less than, or equal to the current pixel. The specific numbering of sub-classes in FIG. 6 is shown for illustration purposes only and other numberings are also contemplated. For example, referring to sub-class 0, at Line 1, Line 1 is defined by three points or pixel values: left neighbor pixel value (L), current pixel value (C) and right neighbor pixel value (R). Line 1, therefore illustrates a current pixel value C with a left neighboring pixel L having a smaller value and a right neighboring pixel R having a greater value than C. Line 2 illustrates a current pixel value C with a left neighboring pixel L having a higher value and a right neighboring pixel R having a smaller value than C. Line 3 illustrates a current pixel value C with a left neighboring pixel L having an equal value and a right neighboring pixel R having an equal value to C.

Generally, for sub-class 0, no offset is applied to the current pixel value C. For sub-class 1 and sub-class 2, the current pixel value C is generally lower than its neighboring pixels L and R, so a positive offset value to increase the value of C may be applied. For sub-class 3 and sub-class 4, the current pixel value C is generally greater than its neighboring pixels L and R, so a negative offset value to decrease the value of C may be applied. Generally, the offset (O) for a given sub-class is applied to all pixels in the sub-class, and the output (V) of the EO operation is V=C+O.

Figure 7:
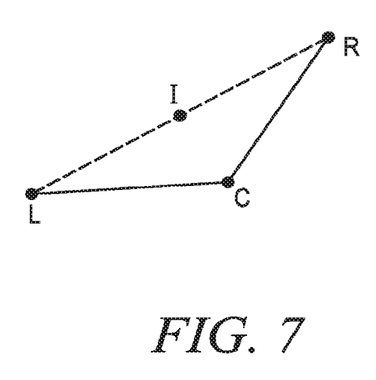
FIG. 7 illustrates an example of a segmented line formed by three pixel values or points L, C, and R according to embodiments of the disclosure.

In some embodiments, a predicted or interpolated current pixel value (I) may be generated using a weighted combination of its two neighbors, L and R. For example, if $2*C>(L+R)$, then the interpolated pixel value (I) can be computed as $(L+R+1)>>1$ (round to +infinity). If $2*C<(L+R)$, then the interpolated pixel value (I) can be computed as $(L+R)>>1$ (round to −infinity). In this example, the interpolated current pixel value I is an average of its two neighbors, but in general it can be a weighted combination or function of one or more neighboring values. FIG. 7 illustrates an example of a segmented line formed by L, C, and R and the relationship of I to the segmented line.

In other examples, if $2*C>(L+R)$, then the interpolated pixel value (I) can be computed as $(L+R+1)>>1$ (I is rounded towards C). If $2*C<(L+R)$, then the interpolated pixel value (I) can be computed as $(L+R)>>1$ (I is rounded towards C). For the case of $2*C=(L+R)$, C is effectively already on the interpolated line so that C=I, no offset is applied, and V=C.

While these weighted combinations use a relatively simple function, any function that takes into account one or more neighboring pixel values to generate I may be used. Additionally, the neighboring pixel values need not be the immediate neighboring pixels.

In some embodiments, if C=I, then no offset is applied, and the output (V)=C. If the offset (O) applied to C brings the pixel value away from I, or away from the segmented line formed by (L, I, R), then the offset is applied and V=C+O. If the offset (O) applied to C brings the pixel value towards I (towards the line) but does not pass I, then the offset is applied and V=C+O. If the offset (O) applied to C brings the pixel value towards I and it passes I, then the output pixel value is set to I, that is, V=I. In other words, if the offset (O) is applied to C and the result passes I, then the output value V is set to I, thereby limiting O.

In some embodiments, using the interpolated current pixel value (I) serves as a smoothing function because it operates as a limit defined by a function (e.g., average) of its neighbors. This, in turn, allows the offset (O) to serve efficiently both as a noise threshold to reduce variations caused by noise and as a signal enhancer to restore signal values.

Generally, offsets (O) may be allowed to be applied both towards and away from the segmented line formed by (L, I, R or L, C, R), such that the offset can be defined to be a signed value, where the sign can indicate the direction towards or away from the line, and the magnitude indicates the amount of movement.

In some embodiments, offsets are only allowed to be applied in the direction towards the segmented line formed by (L, I, R), thus allowing a single sign classification (e.g., defining the offset as non-negative). In such instances, only the offset magnitude needs to be transmitted.

In some embodiments, it may be beneficial to define the interpolated pixel value (I) differently than above, such as the rounding for I be away from C. For example, if $2*C>(L+R)$, then the interpolated pixel value (I) can be computed as $(L+R)>>1$ (away from C). If $2*C<(L+R)$, then the interpolated pixel value (I) can be computed as $(L+R+1)>>1$ (away from C). With this definition for I, the application of the offset O can proceed as described above. For example, if $2*C=(L+R)$, C is effectively already on the interpolated line so that C=I, no offset is applied, and V=C. With such a definition for I, it allows for some sharpening to be performed using an offset when C is close to but not equal to I.

In some embodiments, the current pixel value (C) may not be available or is hard to retrieve e.g., LCU boundary pixels. In such instances, the predicted or interpolated pixel value (I) can be derived from the available pixels e.g., along the same direction defined by EO type. The EO offset direction can be defined according to the predicted or interpolated pixel value. In some embodiments, the predicted pixel or interpolated value can be used in classifying the current pixel value, or a combination of the predicted pixel value together with the neighboring pixels can be used in the classification.

Although it was mentioned above that the interpolated pixel value (I) can be a weighted combination of its two neighbors, more generally I can be computed based on different neighboring values as well as on C and other parameters or functions. The parameters can include e.g., coefficients or weights for an M-tap filter or an offset, and the functions can include e.g., linear or non-linear combinations. For example, if the current and two neighboring values are C, L, and R, then the output value V can be computed as V=L+R+W*C+O, where the weight W and offset O can be signaled. These parameters can be signaled to the decoder per partition, LCU, slice, picture, group of pictures, or sequence, or be known to both encoder and decoder without further signaling.

Entropy Coding of Offsets

Referring back to FIG. 6, it has been observed that for sub-class 1 and 2 pixels, the offset tends to be negative (towards the line). For sub-class 3 and 4 pixels, the offset tends to be positive (towards the line). Since in both cases, the offset is applied towards the line, the offset may be defined to be positive if it is in the direction of the line, and negative if away from the line (and zero for no change). With such a definition, entropy coding of the offset can take advantage of the higher probability that the offset will be positive (or non-negative). Consequently, shorter codewords may be assigned to the positive offset values, thereby achieving bit rate savings.

Alternatively, in some embodiments, the negative offsets are ignored or discarded, thus simplifying the coding of offsets. Ignoring the negative offsets may have some advantages for e.g., subjective quality of reconstructed frames. If negative offsets are not used or allowed, then the entropy coding can be designed appropriately. For example, in some embodiments, when negative offsets are not allowed, the most frequent offset in not zero, but rather a positive offset (e.g., 1). In this instance, by assigning the shortest codeword to this positive offset, bit rate savings can be achieved. In other words, assigning the shortest codeword to a most probable non-negative offset may result in greater efficiencies.

Application of EO to Additional (Sub-Class 0) Pixels

In conventional SAO, no offset is applied to sub-class 0 pixels, shown in FIG. 6. In contrast, the present disclosure provides applying an offset to these sub-class 0 pixels as described herein.

As explained above and shown in FIG. 7, a segmented line may be formed by L, R, and C. If the current sub-class 0 pixel value is below the line (e.g., C has a lower value than the average value of its neighbors L, R), the pixel is re-categorized or placed into sub-class 1 or 2 or a new sub-class, e.g., sub-class 5. If the current sub-class 0 pixel value is above the line (e.g., C has a greater value than the average value of its neighbors L, R), the pixel is re-categorized or placed into sub-class 3 or 4 or a new sub-class, e.g., sub-class 6. If the current sub-class 0 pixel is on the line, then it remains as sub-class 0 where no offset is applied. It should be appreciated that using this offset application technique, offsets may be applied to more pixels to improve performance without transmitting additional offsets.

New EO Sub-Class(es)

Figure 8:
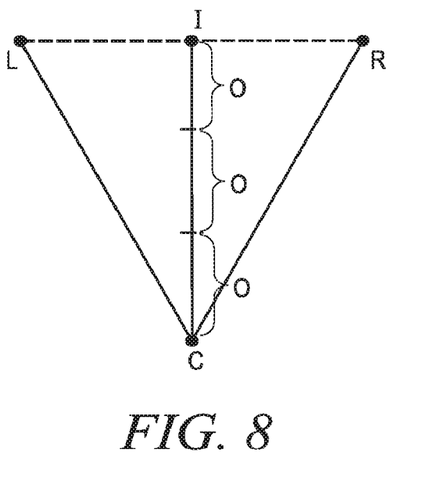
FIG. 8 illustrates an example of a segmented line formed by three pixel values or points L, C, and R according to embodiments of the disclosure.

In some embodiments, additional offset classes or sub-classes can be defined using e.g., distance thresholds, where a different offset is applied based on distances between the current pixel value, the predicted or interpolated pixel value, and/or the neighboring pixel values. For example, FIG. 8 illustrates an example segmented line formed by L, C, and R and the relationship of I to the segmented line. As shown, the current pixel value C is a very large distance from the interpolated pixel value I. Using conventional classification, C would be classified as belonging to sub-class 1, with a standard or predetermined offset O being applied. However, from inspecting FIG. 8, it is apparent that C is approximately the distance of three offsets O from I. Consequently, applying an offset that is larger than the predetermined offset O may be beneficial. In other words, different offsets may be applied depending on the distance between C and I.

In such instances, additional sub-classes can be defined based upon the distance of C from I, and additional offsets can be signaled for each sub-class. Alternatively, a scaled offset can be applied, where the scale factor depends on the distance between C and I.

In some embodiments, when C is close to I, such as within a distance T, an offset that moves in either direction (e.g., a signed offset) is provided to allow for both sharpening or smoothing, where the offset brings C away from or closer to I, respectively. In such instances, a new EO sub-class (EN) may be defined as provided herein.

The current pixel value C may be classified into sub-class EN if |C−I|<T, where T represents a closeness threshold between C and I, and an offset can be transmitted for the new sub-class EN. Otherwise, C may be categorized into other EO sub-classes (e.g., sub-class 0-4) such as before. For example, when T=1, then sub-class EN corresponds to the case where C=I. The entropy coding (e.g., VLC or binarization and CABAC) of sub-class offsets can be modified to better match the statistics of the offset values. For example, in some embodiments, the statistics of the offset values may at least partially depend on In some embodiments, the number of conventional sub-classes (e.g., 5) may be reduced. For example, sub-class 1 and 2 pixels may be combined into a new sub-class 1' and sub-class 3 and 4 pixels may be combined into a new sub-class 2', resulting in two offsets per EO type. For non-sub-class 0 pixels, the new sub-class 1' pixels are such that the two neighbors are both greater than or equal to the current pixel, and for non-sub-class 0 pixels, the new sub-class 2' pixels are such that the two neighbors are both less than or equal to the current pixel. A generalization of defining sub-classes to reduce the overall number of sub-classes and inclusion of pixels in current sub-class 0 can be achieved by defining two (three total) sub-classes of pixels: One group has pixel values higher than interpolated value I, and a second group has pixel values lower than interpolated value I (and the third sub-class has pixels that are equal to interpolated value I). By reducing the number of EO sub-classes, complexity may be reduced and fewer offsets need to be transmitted.

Modification in Number of EO Sub-Classes

In some embodiments, the number of conventional sub-classes (e.g., 5) may be reduced. For example, sub-class 1 and 2 pixels may be combined into a new sub-class 1' and sub-class 3 and 4 pixels may be combined into a new sub-class 2', resulting in two offsets per EO type. For non-sub-class 0 pixels, the new sub-class 1' pixels are such that the two neighbors are both greater than or equal to the current pixel, and for non-sub-class 0 pixels, the new sub-class 2' pixels are such that the two neighbors are both less than or equal to the current pixel. A generalization of defining sub-classes to reduce the overall number of sub-classes and inclusion of pixels in current sub-class 0 can be achieved by defining two (three total) sub-classes of pixels: One group has pixel values higher than interpolated value I, and a second group has pixel values lower than interpolated value I (and the third sub-class has pixels that are equal to interpolated value I). By reducing the number of EO sub-classes, complexity may be reduced and fewer offsets need to be transmitted.

Further reduction of sub-classes for the purpose of optimizing offsets can be achieved by classifying pixels into two categories. The first category may include all the pixels with the same value as the interpolated value I. The second category may include all the other pixels. In such instances, two offsets (one for each of the two sub-classes) may be signaled, or one offset may be signaled for the second category. The signaled offset value for the first category, if signaled, may be a signed value while the signaled offset value for the second category may be unsigned and the sign of actual offset, to be applied to each pixel, may be derived from the relative position of that pixel relative to the interpolated value I.

As described above, there are four possible EO types or classes, and five possible sub-classes per type. As used here, EO type or class refers to the direction along where pixels will be processed, and sub-class refers to the categorization of pixel values according to the gradient pattern along the EO type or class direction. In some embodiments, the number of EO sub-classes may be extended to a total of nine sub-classes, where each pixel is classified depending on whether it is smaller, equal, or larger than the two neighboring pixels along the direction indicated by EO type or class.

It should be appreciated that although the number of EO sub-classes was described as including nine, any suitable increased number (e.g., greater than five) may be used. Because of the additional number of sub-classes, more offsets may need to be sent to the decoder. Although more offsets may need to be sent for the additional sub-classes, the reduction in distortion may improve performance.

In some embodiments, one or more of the above EO modifications can be combined to improve overall performance. It should be appreciated that the SAO (EO) sub-classes and offsets described herein can be signaled at a partition, LCU, slice, picture, group of pictures, or sequence level. The SAO (EO) sub-classes and offsets can also be combined with band offset types and offsets signaled at the partition, LCU, slice, picture, group of pictures, or sequence level.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent exemplary embodiments of the disclosure and are therefore representative of the subject matter which is broadly contemplated by the present disclosure. It is further understood that the scope of the present disclosure fully encompasses other embodiments and that the scope of the present disclosure is accordingly limited by nothing other than the appended claims.

What is claimed is:

1. A method for decoding an encoded block of an encoded video frame, the method comprising:
   decoding the encoded block using a sample adaptive offset compensated value generated by applying an offset value to a current pixel value of the encoded block, the sample adaptive offset compensated value limited by an interpolated pixel value generated using vertically deblocked left and right neighboring pixel values of the current pixel value.

2. The method of claim 1, further comprising:
   determining an edge offset type based on a codeword signaled within an encoded bitstream including the encoded video frame;
   selecting an edge offset sub-class for the current pixel value, the edge offset sub-class corresponding to the edge offset type; and
   determining the offset value based on the edge offset sub-class.

3. The method of claim 2, wherein the edge offset sub-class is selected based on comparisons between the current pixel value and each of the left and right neighboring pixel values.

4. The method of claim 2, wherein a different edge offset sub-class is selected for the current pixel value responsive to determining that the current pixel value is different from a weighted combination of the left and right neighboring pixel values.

5. The method of claim 2, wherein the edge offset type is not signaled within the encoded bitstream when an offset applied for encoding the encoded block is negative.

6. The method of claim 1, wherein the left and right neighboring pixel values are averaged to generate the interpolated pixel value.

7. An apparatus for decoding an encoded block of an encoded video frame, the apparatus comprising:
   a processor configured to execute instructions stored in a non-transitory storage medium to:
      decode the encoded block using a sample adaptive offset compensated value generated by applying an offset value to a current pixel value of the encoded block, the sample adaptive offset compensated value limited by an interpolated pixel value generated using vertically deblocked left and right neighboring pixel values of the current pixel value.

8. The apparatus of claim 7, wherein the instructions include instructions to:
   determine an edge offset type based on a codeword signaled within an encoded bitstream including the encoded video frame;
   select an edge offset sub-class for the current pixel value, the edge offset sub-class corresponding to the edge offset type; and
   determine the offset value based on the edge offset sub-class.

9. The apparatus of claim 8, wherein the edge offset sub-class is selected based on comparisons between the current pixel value and each of the left and neighboring pixel values.

10. The apparatus of claim 8, wherein a different edge offset sub-class is selected for the current value pixel responsive to a determination that the current pixel value is different from a weighted combination of the left and right neighboring pixel values.

11. The apparatus of claim 8, wherein the edge offset type is not signaled within the encoded bitstream when an offset applied for encoding the encoded block is negative.

12. The apparatus of claim 7, wherein the left and right neighboring pixel values are averaged to generate the interpolated pixel value.

13. A method, comprising:
   applying, to a current pixel value, an offset value limited by a weighted combination of vertically deblocked left and right neighboring pixel values of the current pixel value.

14. The method of claim 13, further comprising:
encoding a block including the current pixel value using a sample adaptive offset compensated value generated responsive to the applying.

15. The method of claim 13, further comprising:
decoding an encoded block including the current pixel value using a sample adaptive offset compensated value generated responsive to the applying.

16. The method of claim 13, wherein the offset value is determined based on an edge offset sub-class for the current pixel value.

17. The method of claim 16, wherein the edge offset sub-class is selected based on a codeword representing an edge offset type within an encoded bitstream including an encoded block, the encoded block including the current pixel value.

18. The method of claim 17, wherein the encoded bitstream does not include codewords representing edge offset types for blocks encoded using a negative offset.

* * * * *